No. 613,558. Patented Nov. 1, 1898.
J. F. CLASS.
ANIMAL TRAP.
(Application filed Mar. 4, 1898.)
(No Model.) 2 Sheets—Sheet 1.
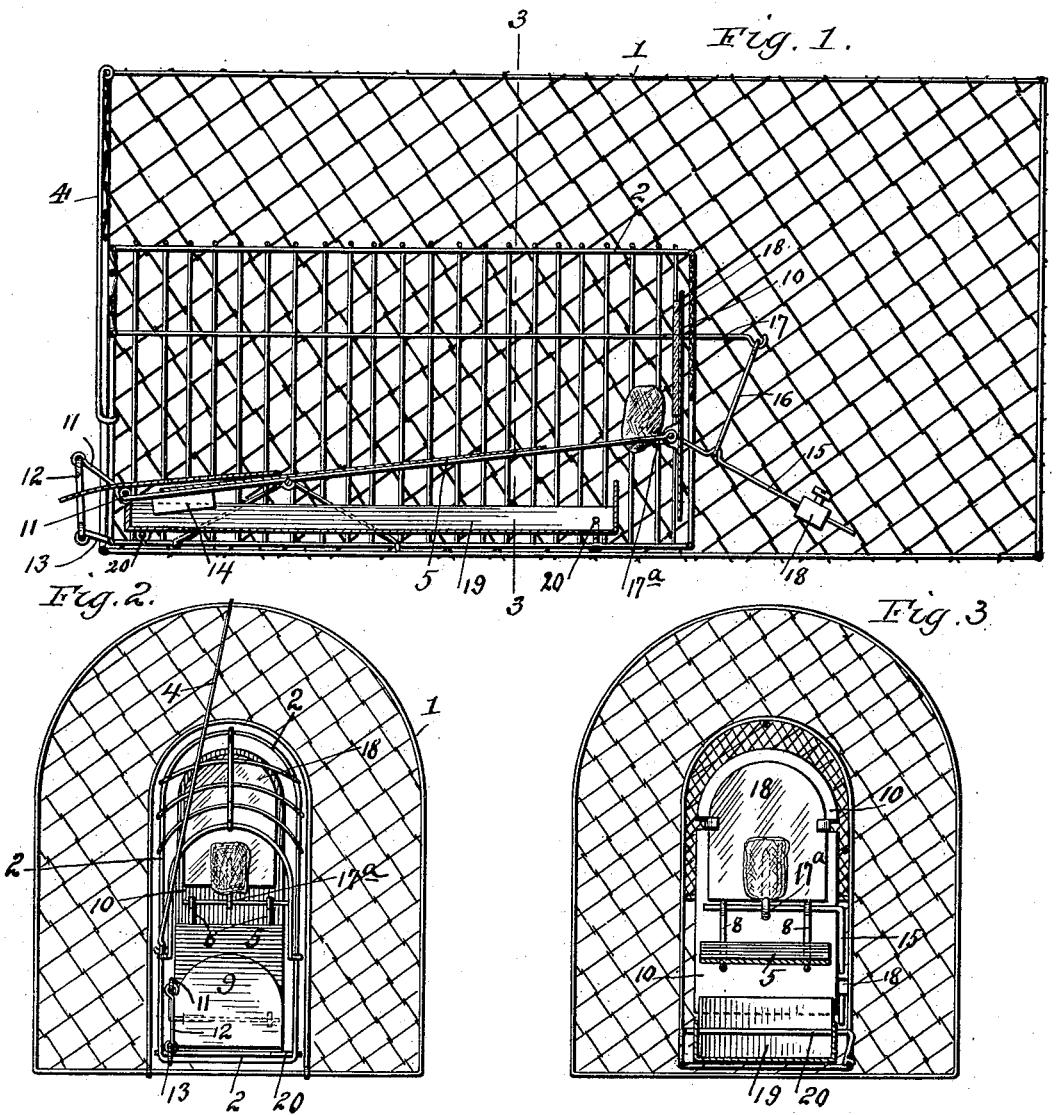
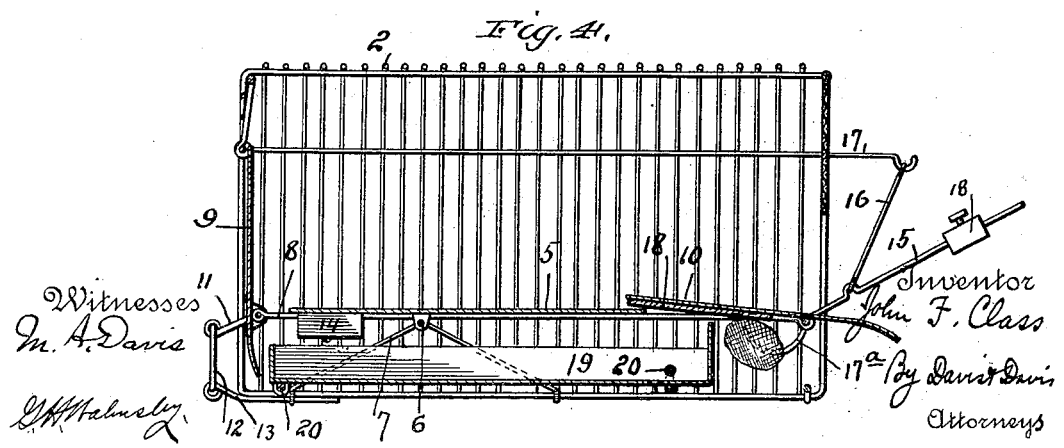

No. 613,558. Patented Nov. 1, 1898.
J. F. CLASS.
ANIMAL TRAP.
(Application filed Mar. 4, 1898.)
(No Model.) 2 Sheets—Sheet 2.
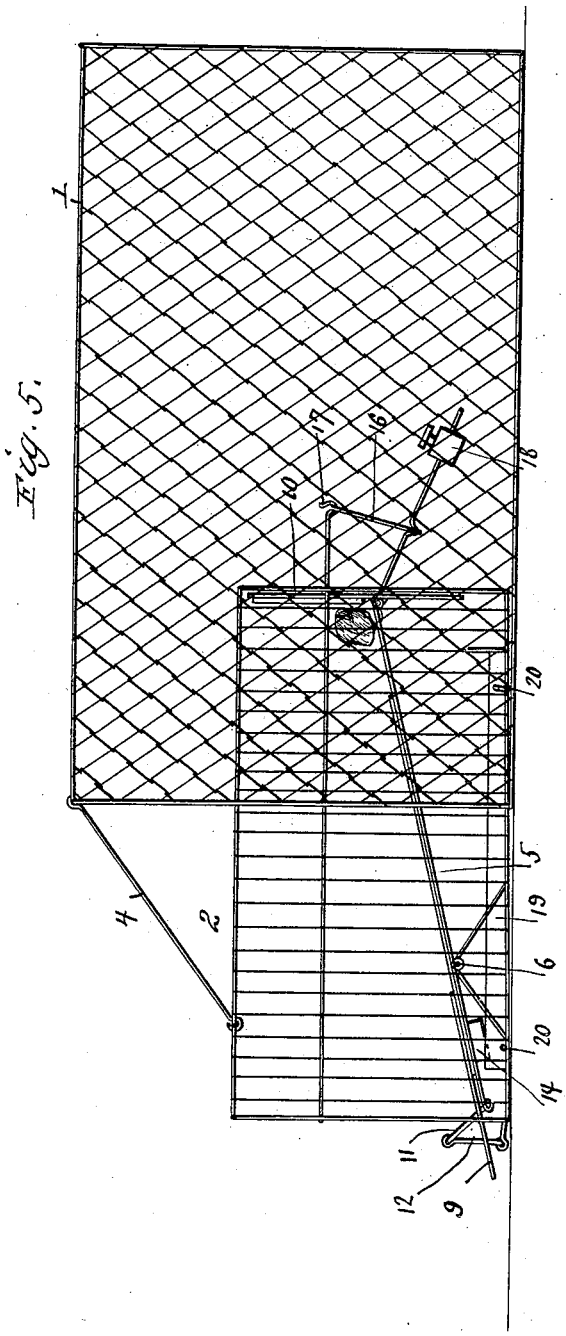
Witnesses
G. M. Lamasure
G. H. Walmsley.
Inventor
John F. Class
By Davis & Davis
Attorneys

UNITED STATES PATENT OFFICE.

JOHN F. CLASS, OF PLEASANT HILL, OHIO.

ANIMAL-TRAP.

SPECIFICATION forming part of Letters Patent No. 613,558, dated November 1, 1898.

Application filed March 4, 1898. Serial No. 672,528. (No model.)

*To all whom it may concern:*

Be it known that I, JOHN F. CLASS, a citizen of the United States, residing at Pleasant Hill, in the county of Miami and State of Ohio, have invented certain new and useful Improvements in Animal or Rat Traps, of which the following is a specification, reference being had therein to the accompanying drawings, in which—

Figure 1 is a longitudinal section view showing the entrance-cage entirely within the prison. Fig. 2 is a front elevation. Fig. 3 is a sectional view on line 3 3, Fig. 1. Fig. 4 is a longitudinal sectional view of the entrance-cage. Fig. 5 is a side elevation showing the entrance-cage partly outside the prison-cage.

This invention relates to an improvement in that class of traps which consists of a main prison or cage and an entrance-cage, this latter cage being provided with a door at each of its ends, said doors being so connected that when the forward door is open the rear one is closed, mechanism being provided whereby when the animal enters through the front door said door will close behind it and the rear door will open and permit it to pass into the prison, and as soon as the animal passes into the prison the entrance-door will open and the rear door will close, thereby resetting the trap and preventing the escape of the imprisoned animal.

The invention consists in the novel combination and arrangement of parts hereinafter described.

Referring to the various parts by numerals, 1 designates the prison or main cage, which may be of any desired shape and capacity, and 2 designates the entrance-cage. This entrance-cage is formed of any desired shape in cross-section, and in one end of the prison-cage is an opening of the same size and shape as the cross-sectional form of the entrance-cage, so that said cage may be inserted in said opening and when therein will entirely close it. To secure the entrance-cage in position, a bar 4 is pivoted on the prison and its hooked free end is adapted to engage the cage at any suitable point and hold it in the opening.

The entrance-cage is formed long and narrow, and both its ends are open. Pivoted therein, at a suitable point above its bottom, is a seesaw or treadle 5, which is nearly equal in length to the cage. This treadle is pivoted on a transverse bar 6, which is supported by the brackets 7, forward of the transverse center of said treadle. Journaled in the front ends of the bars 8, which project forward from the treadle, is the pivot-bar of the front door 9 of the entrance-cage, and journaled in the rear ends of these bars 8, which ends project rearwardly from the treadle, is the pivot-bar of the rear door 10 of the entrance-cage. These doors are secured rigidly to their bars, and they project a sufficient distance above and below their pivotal points to close the respective openings when in their upright positions. One end of the pivot-rod of the front door 9 is bent outwardly at right angles to the main portion thereof to form arm 11, and to the outer end of this arm is pivoted a link 12, whose lower end is in turn pivoted to the end of a rod 13, projecting forward from the bottom of the entrance-cage. Secured to the under side of the treadle, near its forward end, is a weight 14, which normally holds the said forward end depressed and the front door open. One end of the pivot-bar of the rear door is bent outwardly to form the arm 15, and to this arm, at a suitable point, is pivoted a link 16, whose upper end is pivoted to a bar 17, carried by the cage above the pivot of the door 10. The arm 15 is carried rearwardly beyond its point of connection with link 16, and carried on said extended portion is an adjustable weight 18. Carried on the pivot-rod of the rear door and on the inner side thereof is the bait-hook 17$^a$, and secured to said door, back of the bait-hook, is a mirror 18, which shows a reflection of the bait and any animal which may enter the front door. The upper edge of the front door 9 in its closed position contacts with the upper edge of the opening at the inner side thereof and prevents the door being opened outwardly. The lower end of this door in its open position extends outside of the cage to form a gangway for the animals. The upper portion of the rear door extends almost entirely above the upper edge of the rear opening, the pivot of said door when the door is closed being only slightly below said upper edge of the opening. This is to prevent the imprisoned animals from pressing the door inwardly, and thereby forcing it open. Any pressure put upon the door below the pivot will force the upper end of the door against the cage.

Within the entrance-cage, below the seesaw, is removably secured a pan 19, in which may be placed any material to attract the animals. This pan is secured in position by means of removable rods 20, which extend transversely of the entrance-cage at each end of the pan. One of these rods (the rear one) passes through the side of the pan and forms a hinge, upon which the pan may be swung down when it is not desired to remove it entirely. The bottom of the entrance-cage is open, so that the bait-hook and pan may be readily reached through the bottom when the entrance-cage is removed from the prison.

If the trap is to be set in a small place, the entrance-cage may be placed entirely within the prison, as shown in Fig. 2; but, if desired and there is plenty of room, it may be placed partly or entirely outside thereof and secured by hooked rod 4, as shown in Fig. 1.

In the normal position of the mechanism the weight 14 depresses the forward end of the seesaw 5, and because of the pivotal connection between the arm 11 and swinging link 12 the door 9 is folded down on the upper side of the seesaw or treadle, as shown, and because of the pivotal connection between the arm 15 and the swinging link 16 the rear door is held in an upright position when the rear end of the seesaw is raised. By means of the adjustable weight 18 the door 10 may be caused to close at the proper time. When an animal has entered the front door and has passed up the seesaw to a point beyond the pivot 6, the rear end of the seesaw will be depressed and the rear door will be opened and the front door will be closed, as shown in Fig. 5. The mirror will show an image of the incoming animal and induce the real animal to make a rush to secure the bait. After the animal has passed through the rear opening of the cage into the prison the weight 14 causes the doors to assume their normal positions. The pan 19 is practically covered by the seesaw or treadle, and the animals are unable to reach its contents. The bait-hook passes down between the rods 8 when the rear door opens and is out of the way of the ingoing animal.

It will be understood that I do not limit myself to the exact construction shown, as modifications of the details may be made without departing from the scope of the invention.

It will also be understood that the trap may be constructed any size to suit it to the desired use.

Having thus fully described my invention, what I claim, and desire to secure by Letters Patent, is—

1. In a trap the combination of a prison-cage, formed with an opening in one of its sides, and a removable entrance-cage adapted in cross-section to fit within said opening, means for securing the entrance-cage at any point within said opening, and means carried by the entrance-cage to permit the animals to enter the prison and to prevent their escape therefrom.

2. In a trap the combination of a prison and an entrance-cage, means within the entrance-cage to permit the passage of the animals to the prison and to prevent their escape therefrom said means consisting of a seesaw or treadle, a door pivoted on each end of said seesaw, the pivot-rod of each door being bent outwardly, a swinging link pivoted to each of said arms, the other ends of said links being pivotally connected to the entrance-cage, and a weight for normally depressing the forward end of the seesaw, substantially as described.

3. In a trap, the combination of a prison, and an entrance-cage, a treadle or seesaw within the entrance-cage, a door pivoted to each end thereof and adapted to alternately close the front and rear of the entrance-cage, and a bait-hook carried by the rear door and adapted to swing forward below the seesaw when the rear door is opened, substantially as described.

4. In a trap, the combination of a prison, an entrance-cage, open at both ends, a door for each end, means for normally holding the front door open and the rear door closed, a bait-hook carried by the rear door, a mirror back of the bait-hook, and means for closing the front door and opening the rear door when the ingoing animal reaches a certain point, substantially as described.

5. In a trap, the combination of a prison, an entrance-cage, open at both ends, a door for each end, means for normally holding the front door open and the rear door closed, a bait-hook carried by the rear door, a mirror carried by said door back of the bait-hook, and means for closing the front door and opening the rear door when the ingoing animal reaches a certain point, substantially as described.

6. In an animal-trap, the combination of a prison, an entrance-cage open at both its ends, doors for said openings, means for normally holding the front door open and the rear door closed and for closing the front door and opening the rear door when the ingoing animal has reached a certain point, said means consisting of the treadle and suitable connections, and a bait-pan within the entrance-cage below the treadle and protected from the animals thereby, said pan being removable independently of the entrance-cage and treadle, substantially as described.

In testimony whereof I hereunto affix my signature this 1st day of March, 1898.

JOHN F. CLASS.

Witnesses:
W. O. PUTTY,
J. E. HALL.